(12) United States Patent
Onodera

(10) Patent No.: US 10,661,493 B2
(45) Date of Patent: May 26, 2020

(54) BLOW-MOLDING METHOD

(71) Applicant: Kyoraku Co., Ltd., Kyoto-Shi, Kyoto (JP)

(72) Inventor: Masaaki Onodera, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 229 days.

(21) Appl. No.: 15/539,082

(22) PCT Filed: Dec. 18, 2015

(86) PCT No.: PCT/JP2015/085531
§ 371 (c)(1),
(2) Date: Jun. 22, 2017

(87) PCT Pub. No.: WO2016/104373
PCT Pub. Date: Jun. 30, 2016

(65) Prior Publication Data
US 2017/0341285 A1 Nov. 30, 2017

(30) Foreign Application Priority Data

Dec. 25, 2014 (JP) ................................ 2014-262584

(51) Int. Cl.
*B29C 49/04* (2006.01)
*B29C 48/475* (2019.01)
(Continued)

(52) U.S. Cl.
CPC .......... *B29C 49/04* (2013.01); *B29C 48/0017* (2019.02); *B29C 48/475* (2019.02);
(Continued)

(58) Field of Classification Search
CPC .................................................. B29C 49/041
See application file for complete search history.

(56) References Cited

U.S. PATENT DOCUMENTS

| 2004/0185241 A1* | 9/2004 | Anderson | B29C 44/08 |
| | | | 428/304.4 |
| 2012/0060960 A1* | 3/2012 | Sumi | B29C 51/02 |
| | | | 138/141 |

(Continued)

FOREIGN PATENT DOCUMENTS

| JP | 07-290563 A | 11/1995 |
| JP | 07-299862 A | 11/1995 |

(Continued)

OTHER PUBLICATIONS

International Search Report dated Mar. 15, 2016 filed in PCT/JP2015/085531.

*Primary Examiner* — Alex A Rolland
(74) *Attorney, Agent, or Firm* — Maier & Maier, PLLC

(57) ABSTRACT

Provided is a blow-molding method capable of suppressing generation of blister-like bubbles and producing a high quality hollow molded article when forming a thick hollow molded article by blow-molding. A blow-molding method includes setting a die-slit interval in a die head according to a target wall thickness of a hollow molded article to be molded, extruding a molten resin in an accumulator into a cylindrical shape from the die slit to form a parison, and molding the parison in a mold. The die-slit interval is made smaller than a value set according to the target wall thickness at start of extrusion, and then is increased to match the value set according to the target wall thickness. The value set according to the target wall thickness is preferably corrected considering wall thickness reduction due to drawdown. The wall thickness of the hollow molded article is preferably 3.5 mm or more.

6 Claims, 3 Drawing Sheets

(51) Int. Cl.
  *B29C 48/00*  (2019.01)
  *B29C 48/92*  (2019.01)
  *B29C 49/78*  (2006.01)
  *B29L 23/00*  (2006.01)
  *B29L 31/30*  (2006.01)
  *B29L 31/00*  (2006.01)
  *B29C 48/275*  (2019.01)
  *B29C 48/325*  (2019.01)
  *B29C 48/30*  (2019.01)
  *B29C 48/09*  (2019.01)
  *B29K 23/00*  (2006.01)
  *B29K 105/04*  (2006.01)

(52) U.S. Cl.
  CPC .............. *B29C 48/92* (2019.02); *B29C 48/09* (2019.02); *B29C 48/277* (2019.02); *B29C 48/30* (2019.02); *B29C 48/325* (2019.02); *B29C 49/041* (2013.01); *B29C 49/78* (2013.01); *B29C 2948/9298* (2019.02); *B29C 2948/92514* (2019.02); *B29C 2948/92647* (2019.02); *B29C 2948/92876* (2019.02); *B29C 2948/92904* (2019.02); *B29C 2948/92961* (2019.02); *B29K 2023/12* (2013.01); *B29K 2105/04* (2013.01); *B29L 2023/22* (2013.01); *B29L 2023/225* (2013.01); *B29L 2031/30* (2013.01); *B29L 2031/7492* (2013.01); *C08J 2323/12* (2013.01); *Y02P 70/263* (2015.11)

(56) References Cited

U.S. PATENT DOCUMENTS

| | | |
|---|---|---|
| 2013/0032963 A1 | 2/2013 | Tokiwa et al. |
| 2013/0216747 A1 | 8/2013 | Ishida |
| 2015/0258718 A1 | 9/2015 | Onodera et al. |

FOREIGN PATENT DOCUMENTS

| | | | |
|---|---|---|---|
| JP | 07290563 A | * | 11/1995 |
| JP | 08-099349 A | | 4/1996 |
| JP | 2009-143079 | | 7/2009 |
| JP | 2011-201085 A | | 10/2011 |
| JP | 2013-166896 A | | 8/2013 |
| WO | 2014/057786 A1 | | 4/2014 |

* cited by examiner

BLOW-MOLDING METHOD

CROSS-REFERENCE TO RELATED APPLICATIONS

This is a U.S. national phase application under 35 U.S.C. § 371 of International Patent Application No. PCT/JP2015/085531, filed on Dec. 18, 2015, and claims benefit of priority to Japanese Patent Application No. 2014-262584, filed Dec. 25, 2014. The entire contents of these applications are hereby incorporated by reference.

TECHNICAL FIELD

The present invention relates to a blow-molding method. The present invention relates more particularly to a method for reducing cells when forming a relatively thick hollow molded article by foamed blow-molding.

BACKGROUND

Known examples of the blow-molded foam include a climate control duct provided in an instrument panel of a vehicle. The climate control duct often employs a foamed duct formed by molding a foamed resin material. The foamed duct is light in weight. Such a foamed duct can be manufactured easily in a manner that, for example, the resin material such as polyolefin resin including a foaming agent is melted and kneaded and then a foamed parison extruded out of a die head (die slit) of an extruder is blow-molded.

The resin material used for the blow-molded foam is often polyolefin resin. In particular, polypropylene resin is generally used. In recent years, using polyethylene resin alternatively has been examined for the purpose of reducing the material cost.

As described above, in blow-molding, molten resin is extruded from the die slit as a cylindrical parison, and is blow-molded in a mold. At this time, thickness of the parison is adjusted by adjusting a die-slit interval (slit width), so that a wall thickness of the hollow molded article to be molded is a designed value.

However, when a size of the hollow molded article is large or the wall thickness thereof is thick, weight per shot is increased to cause possibility of drawdown. Drawdown is a phenomenon in which the parison is stretched by its own weight and the wall thickness of an upper portion thereof is reduced. Drawdown results in wall thickness difference in a product (the hollow molded article).

In order to avoid drawdown, for example, it may also be possible to change a compound ratio of resin to be used. However, it is undesirable because the resin to be used is restricted by this method. Therefore, a method for correcting the thickness of the parison extruded from the die slit has also been proposed (for example, refer to Japanese Patent No. 07-290563).

In particular, Japanese Patent No. 07-290563 discloses a blow-molding method in which a metering stroke S of an accumulator is set based on a required resin weight W calculated from a target length L and a target wall thickness t of the parison. Further, a die gap set value Dt obtained by dividing the target wall thickness t by a swell ratio R is corrected by a wall thickness reduction amount due to a drawdown phenomenon caused by a stroke length x. Thus, a die gap final set value Df is set to form a desired parison.

SUMMARY

Meanwhile, in forming a relatively thick hollow molded article by foamed blow-molding or the like, a phenomenon that blister-like cells are formed on a surface of the hollow molded article is a problem. Although influence of drawdown can be minimized by adopting the method described in the above-described Patent Literature 1, generation of the blister-like cells cannot be suppressed.

The present invention has been proposed in view of such conventional circumstances. An object of the present invention is to provide a blow-molding method as follows. In the blow-molding method, even when forming a thick hollow molded article by blow-molding, it is possible to suppress generation of the blister-like cells, and thus it is possible to produce a high quality hollow molded article.

A blow-molding method according to the present invention for achieving the above objective includes: setting an interval of a die slit in a die head according to a target wall thickness of a hollow molded article to be molded; extruding a molten resin in an accumulator into a cylindrical shape from the die slit to form a parison; and molding the parison in a mold. The interval of the die slit is made smaller than a value set according to the target wall thickness at start of extrusion, and then the interval of the die slit is increased to match the value set according to the target wall thickness.

When forming the thick hollow molded article by blow-molding, it is necessary to increase the interval (slit width) of the die slit. Because thickness of the hollow molded article is proportional to the interval of the die slit. When the die slit is open to have a value set according to a target wall thickness of the hollow molded article to be molded at start of extrusion of the parison, a rapid pressure drop occurs and a resin pressure in the accumulator is reduced. As a result of repeated trial and error, the present inventors have found that reduction of the resin pressure in the accumulator is a cause of the blister-like cells.

In the present invention, at the start of extrusion of the parison, the interval of the die slit is made smaller than a value set according to the target wall thickness. Thus, the rapid pressure drop is suppressed and the resin pressure in the accumulator is maintained at a predetermined level. Therefore, generation of the blister-like cells is suppressed.

According to the present invention, it is possible to provide a blow-molding method capable of producing a high quality hollow molded article without generation of the blister-like cells.

DETAILED DESCRIPTION

Hereinafter, an embodiment of blow-molding method according to the present invention will be described in detail with reference to the drawings by taking blow-molding of a foamed duct as an example.

Figure 1:
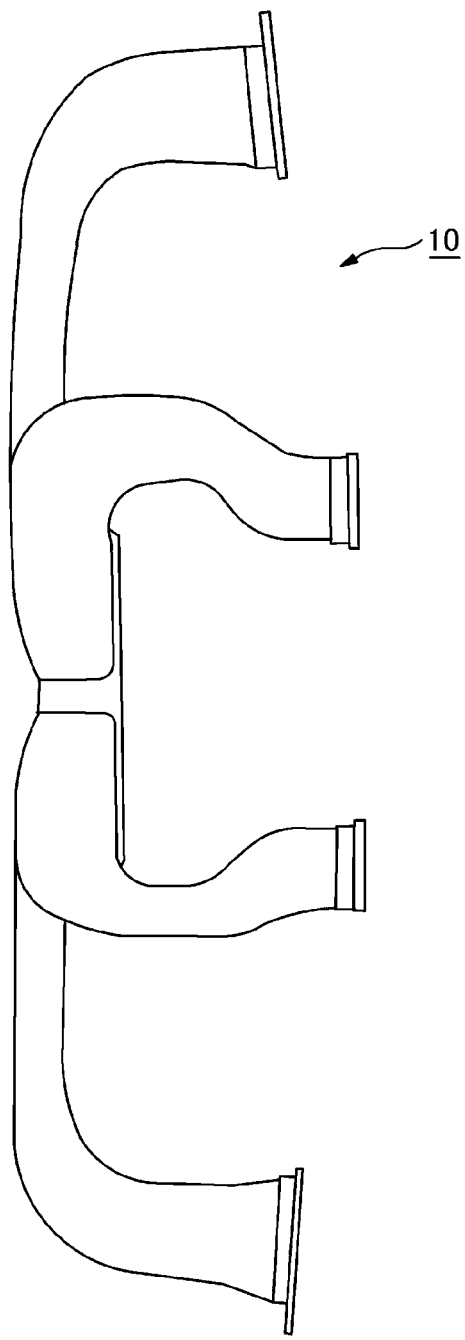
FIG. 1 is a schematic perspective view of an example of a foamed duct.

A foamed duct 10 as a -molded foam is configured to let the conditioned air flow from an air-conditioner unit (not shown) to a desired portion along an inner flow path. The shape of the foamed duct 10 is not limited to the shape illustrated in FIG. 1. The shape may be arbitrarily determined in accordance with the intended purpose and the place to install.

The foamed duct 10 according to the embodiment can be obtained by having a foamed parison, which is formed by extruding a foamed resin from a die of an extruder, held in a mold and blow-molding the parison. The duct just after the blow-molding has opposite ends closed. After the blow-molding, the opposite ends are cut through trimming, thereby forming the open shape.

The foamed duct 10 according to the embodiment includes a hollow foamed resin molded article with a pipe wall formed by a foamed layer. The structure including the foamed layer with a closed cell structure enables to form the duct with the small weight and the excellent heat insulating property. The closed cell structure is the structure including a plurality of closed cells, and refers to a structure having a closed cell content of at least 70% or more. Such a structure hardly allows the dew condensation even if the cool air flows into the foamed duct 10.

The foamed duct 10 of the present embodiment basically uses polypropylene resin as a foamed resin material. The polypropylene resin has characteristics of easy optimization in physical properties and the like and good foam moldability.

As the polypropylene resin to be used, there are a propylene homopolymer, a random or block copolymer of propylene and another α-olefin, and the like. As another α-olefin to be copolymerized with propylene, there are ethylene, butene, pentene, hexene, octene, methylpentene and the like. Although an amount of α-olefin to be copolymerized with propylene is arbitrary, however, it is preferably, for example, about 0.1 to 20 mass % in order to maintain excellent physical properties of polypropylene.

The polypropylene resin preferably has a long-chain branched structure. The polypropylene resin has a disadvantage that melt tensile force during melting is small and molding processability is poor in foam molding. However, melting characteristics can be improved by introducing the long-chain branched structure, and thus it is possible to solve the disadvantage.

In the foamed duct 10, by using polyethylene-based elastomer in addition to the polypropylene resin, impact resistance may be improved, so that foam moldability and impact resistance can be both satisfied.

The polyethylene-based elastomer is obtained by finely dispersing an olefin-based rubber in a matrix of polyethylene resin. The polyethylene-based elastomer is excellent in compatibility with the polypropylene resin and has a characteristic capable of improving the impact resistance by imparting rubber elasticity to a resin material.

Ratio of the polyethylene-based elastomer in the resin material is preferably 5 mass % or more for purpose of improving the impact resistance. When the ratio of the polyethylene-based elastomer is less than 5 mass %, there is a possibility that the impact resistance of the foamed duct 10 is insufficient. The greater the ratio of polyethylene-based elastomer is, the more advantageous for improving the impact resistance. However, when the ratio of the polyethylene-based elastomer increases too much, the ratio of polypropylene resin is relatively reduced, and it is difficult to maintain excellent physical properties such as foam moldability of the polypropylene resin. From such a viewpoint, the ratio of polyethylene-based elastomer is preferably 35 mass % or less. That is, the ratio of polyethylene-based elastomer is preferably 5 to 35 mass %.

To manufacture the foamed duct 10, the polypropylene resin and the like added with an additive such as an antioxidant as needed are subjected to blow-molding. Foaming is carried out using a foaming agent in blow-molding. The foaming agent may be an inorganic foaming agent such as air, carbonic acid gas, nitrogen gas, or water, or an organic foaming agent such as butane, pentane, hexane, dichloromethane, or dichloroethane. Among these, the foaming agent is preferably air, carbonic acid gas, or nitrogen gas. By using any of these, contamination by organic matter can be prevented and deterioration of durability and the like can be suppressed.

Figure 2:
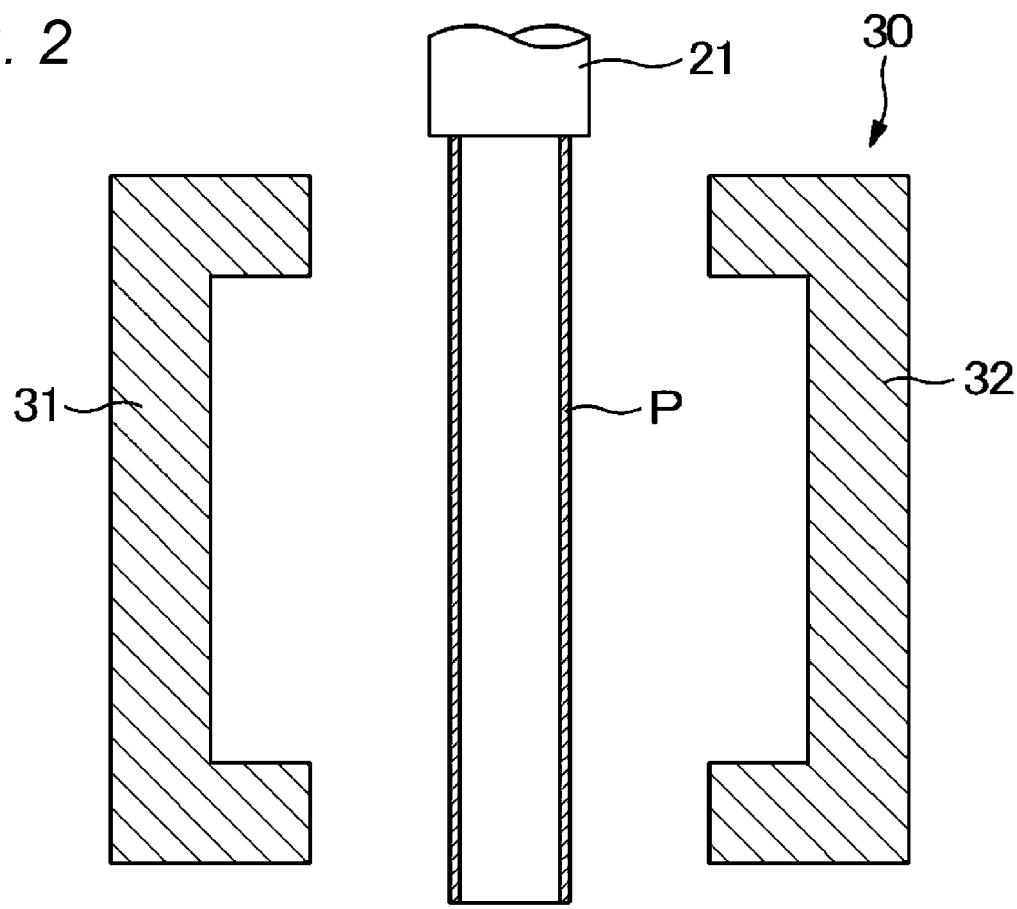
FIG. 2 is a schematic cross-sectional diagram schematically showing an aspect when forming a duct by blow-molding.

A method of foaming preferably employs a supercritical fluid. That is to say, carbonic acid gas or nitrogen gas in a supercritical state is preferably used to foam the resin material. By using the supercritical fluid, it is possible to foam the resin material uniformly and reliably. The thusly foamed polyethylene resin is blow-molded by a known method, thereby forming the foamed duct 10. FIG. 2 is a diagram illustrating an aspect when the foamed duct 10 is blow-molded.

In the blow-molding, first, the resin material to be used in the molding is kneaded in the extruder to manufacture the base material resin. If only virgin resin is used in the molding, the virgin resin of the resin material including a modifier added as necessary is kneaded to manufacture the base material resin. In the case of using a recovered resin material, the pulverized recovered resin material including the virgin resin added in a predetermined ratio is kneaded to manufacture the base material resin.

The base material resin with the foaming agent added thereto is mixed in the extruder and then accumulated in an in-die accumulator (not shown). Subsequently, after a predetermined amount of resin is accumulated, the resin is pressed down in a direction orthogonal to the horizontal direction (vertical direction) by a ring-shaped piston (not shown). Then, the base material resin is extruded as a cylindrical parison P between split mold blocks 31 and 32 included in a clamping machine 30 from a die slit of an annular die 21 illustrated in FIG. 2 at an extrusion speed of 700 kg/h or more. After that, the split mold blocks 31 and 32 are clamped with the parison P between the blocks 31 and 32. In addition, air is blown into the parison P at a pressure ranging from 0.05 to 0.15 MPa. Thus, the foamed duct 10 is formed.

The molded resin material is cooled and solidified and a part thereof other than the completed product is pulverized. The pulverized material is collected to provide the recovered resin material. The virgin resin is added to the recovered resin material in a predetermined proportion. With the obtained mixed resin, the blow-molding is similarly performed again. Repeating such a manufacture cycle can produce a large amount of foamed ducts 10.

In the above-described blow-molding, when molding a hollow molded article (the foamed duct 10) having, for example, an expansion ratio of 2.8 times and a thickness of 3.5 mm or more, there is a possibility that drawdown or swelling foaming is a problem. Therefore, the blow-molding method of the present embodiment avoids these phenomena by appropriately control a die-slit interval.

Figure 3:
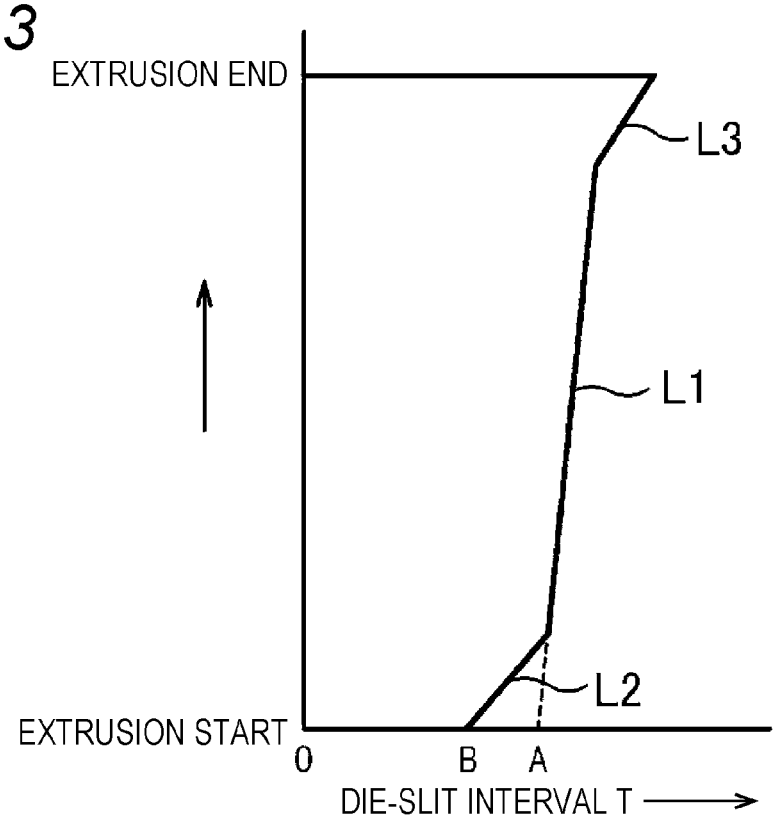
FIG. 3 is a graph showing a change over time of a die-slit interval during extrusion of a parison.

FIG. 3 is a graph showing a change over time of the die-slit interval during extrusion of the parison P. In the blow-molding method of the present embodiment, in consideration of drawdown, a die-slit interval T is gradually increased so that a thickness of the parison P gradually increases. That is, the die-slit interval T is gradually increased as shown by line L1 in FIG. 3. This cancels out a phenomenon that an upper portion of the parison P is pulled downward due to its weight to be thinned.

Therefore, when starting extrusion of the parison P, the die-slit interval is set to an interval indicated by point A obtained by extending line L1 to a start point of extrusion. With such a setting, swelling foaming occurs when molding the thick hollow molded article (foamed duct 10). Therefore, in the present embodiment, extrusion of the parison is started at the die-slit interval indicated by point B narrower than the die-slit interval indicated by point A. The die-slit interval T at point B is, for example, 2 to 3 mm.

After the extrusion of the parison P is started at such a die-slit interval, the die-slit interval is extended along line L2. The die-slit interval reaches previous line L1, and then is gradually extended along line L1. By controlling the die-slit interval T at such a locus, it is possible to suppress reduction of resin pressure in the accumulator, and to suppress generation of blister-like cells.

Figure 4:
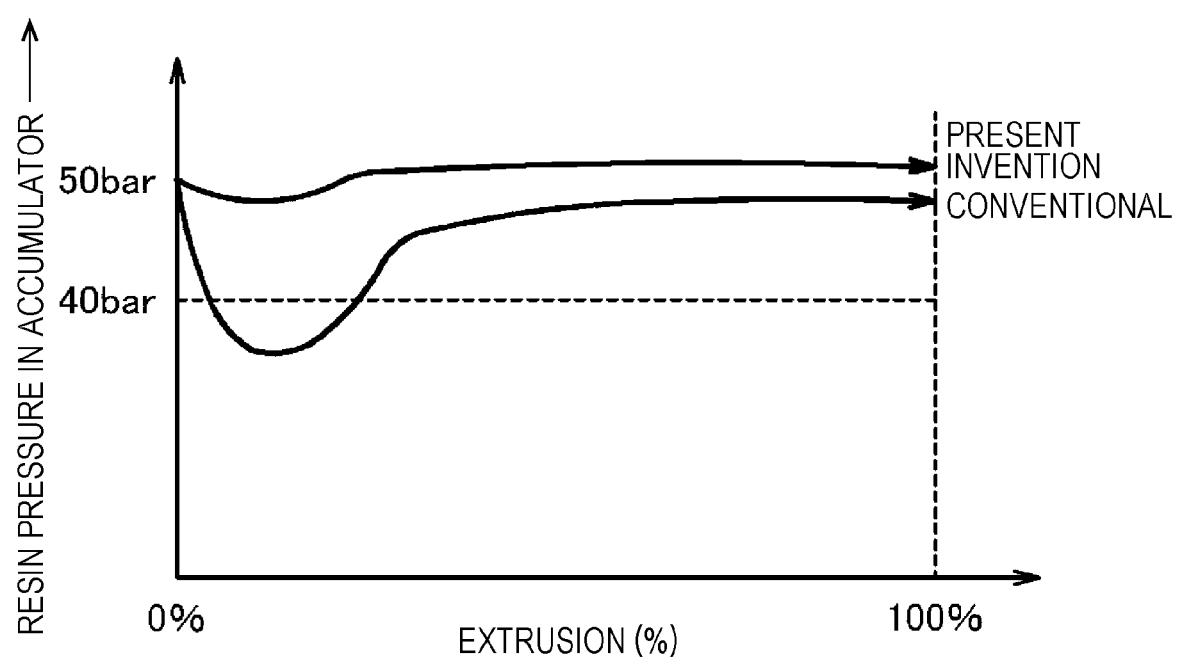
FIG. 4 is a graph showing a change over time of resin pressure in an accumulator during extrusion of the parison.

FIG. 4 is a graph showing a change of the resin pressure in the accumulator after starting extrusion of the parison P. In case of a conventional method (when the die-slit interval is opened to point A at start of extrusion of the parison P), the resin pressure in the accumulator is reduced to less than 40 bar immediately after the start of extrusion (a set value of the resin pressure in the accumulator is 50 bar). In contrast, according to the method of the present invention, reduction of the resin pressure in the accumulator at the start of the extrusion is small, and the resin pressure is not less than 40 bar.

Immediately before end of the extrusion of the parison P, as shown by line L3 in FIG. 3, the die-slit interval is preferably extended more than line L1 in consideration of drawdown to prevent rupture in the upper portion of the parison P. The uppermost part of the parison P may rupture due to various factors. The rupture can be prevented by extending the die-slit interval to increase a thickness of the parison P.

An example of controlling the die-slit interval in the blow-molding method of the present invention has been described above. It is also useful to optimize various molding conditions in the blow-molding method.

For example, in the blow-molding method of the present invention, it is preferred that the expansion ratio is 2.5 to 3.5 times and an average wall thickness of the molded article is 3.5 to 4.5 mm. The resin pressure when the molten resin is filled in the accumulator is preferably 60 bar or more, and more preferably 80 bar or more. Nitrogen gas concentration is preferably less than 0.22 mass %, and more preferably less than 0.20 mass %.

The present invention has been described so far based on the embodiment. However, the present invention is not limited to the embodiment above, and various changes can be made within the scope not departing from the content of the present invention.

EXAMPLES

Specific examples of the present invention will be described based on the experiment results.
Manufacturing of Foamed Duct Using the polypropylene resin and the polyethylene-based elastomer as raw materials, a foamed duct was blow-molded with the following composition. The raw materials used are as follows.

Polypropylene resin A: manufactured by Borealis, product name WB140 (polypropylene having a long-chain branched structure)

Polypropylene resin B: manufactured by Japan Polypropylene Corporation, product name Novatec PP•BC4BSW Polyethylene-based elastomer: manufactured by Mitsui Chemicals, Inc., product name DF605

Composition: (polypropylene resin A):(polypropylene resin B):(polyethylene-based elastomer)=70:23:7 (mass ratio)

Types of gases were Nitrogen gas (Samples 1 to 5) and carbonic acid gas (Samples 6 to 8). Blow-molding was carried out under various conditions to manufacture foamed ducts. Samples 5 and 8 are examples in which the present invention was applied and extrusion of the parison was started at the die-slit interval indicated by point B in FIG. 3. Other Samples correspond to conventional methods and are examples in which extrusion of the parison was started at the die-slit interval indicated by point A in FIG. 3. Total weight of the manufactured foamed ducts is about 5 kg.

Evaluation

With respect to the manufactured foamed ducts, blister and cell diameter were evaluated. Evaluation criteria are as follows.

Blister: Generation of the blister-like cells on a surface of the foamed duct was visually checked. "Poor" was marked when the blister-like cells were observed, "Good" was marked when almost no blister-like cells were observed, and "Excellent" was marked when the blister-like cells were not observed at all.

Cell diameter: A cross section of the foamed duct was observed. "Poor" was marked when a longitudinal diameter of the cell exceeded 1000 μm, "Good" was marked when the longitudinal diameter of the cell was less than 1000 μm, and "Excellent" was marked when the longitudinal diameter of the cell was 700 μm or less.

Table 1 shows the results. As is apparent from Table 1, in Samples 5 and 8 according to the present invention, a good foamed duct having no blisters and having a small cell diameter is molded. In contrast, in the foamed ducts (Samples 1 to 4) manufactured by the conventional method using nitrogen gas, the blister-like cells are generated and product quality is poor. In the foamed ducts (Samples 6, 7) manufactured by the conventional method using carbonic acid gas, almost no blister-like cells are generated, however, the cell diameter is large and product quality is poor in this respect.

TABLE 1

| Condition | Type of gas | Amount of gas wt % | Injection time sec | Resin pressure bar | Blowing pressure kgf/cm² | Specific gravity | Weight with bag g | Average wall thickness mm | Blister | Cell diameter | Evaluation | Adjustment of die slit |
|---|---|---|---|---|---|---|---|---|---|---|---|---|
| Sample 1 | Nitrogen | 0.22 | 4.7 | 40 | 0.8 | 0.32 | 836 | 5.5 | Poor | Excellent | Poor | No |
| Sample 2 | Nitrogen | 0.22 | 4.7 | 40 | 0.8 | 0.32 | 828 | 5.5 | Poor | Excellent | Poor | No |
| Sample 3 | Nitrogen | 0.22 | 6.6 | 40 | 0.8 | 0.37 | 700 | 4.0 | Poor | Excellent | Poor | No |
| Sample 4 | Nitrogen | 0.22 | 4.7 | 40 | 0.8 | 0.30 | 819 | 5.8 | Poor | Excellent | Poor | No |
| Sample 5 | Nitrogen | 0.22 | 5.2 | 40 | 0.8 | 0.29 | 815 | 5.9 | Excellent | Excellent | Good | Yes |

TABLE 1-continued

| Condition | Type of gas | Amount of gas wt % | Injection time sec | Resin pressure bar | Blowing pressure kgf/cm² | Specific gravity | Weight with bag g | Average wall thickness mm | Blister | Cell diameter | Evaluation | Adjustment of die slit |
|---|---|---|---|---|---|---|---|---|---|---|---|---|
| Sample 6 | carbonic acid | 0.46 | 4.7 | 35 | 0.3 | 0.29 | 620 | 4.5 | Good | Poor | Poor | No |
| Sample 7 | carbonic acid | 0.46 | 4.7 | 20 | 0.3 | 0.31 | 684 | 4.7 | Good | Poor | Poor | No |
| Sample 8 | carbonic acid | 0.46 | 5.2 | 20 | 0.3 | 0.30 | 675 | 4.7 | Good | Good | Good | Yes |

The invention claimed is:

1. A blow-molding method comprising:
setting an interval of a die slit in a die head according to a target wall thickness of a hollow molded article to be molded;
extruding a molten resin in an accumulator into a cylindrical shape from the die slit to for a parison; and
molding the parison in a mold, wherein
the interval of the die slit is gradually increased so that a thickness of the parison is gradually increased from a start of extrusion of the parison to a termination of the extrusion of the parison,
an entire period from the start of extrusion to the termination of the extrusion includes first to third periods,
the first period is period from the start of extrusion to an end of the first period,
the second period is period from a start of the second period to an end of the second period, and the start of the second period corresponds to the end of the first period,
the third period is period from the start of the third period to the termination of the extrusion, and the start of the third period corresponds to the end of the second period,
the interval of the die slit is made smaller than a value set according to the target wall thickness at the start of the extrusion, and the die slit is opened at the start of the extrusion,
the value set according to the target wall thickness is set based on the interval of the die slit at the start of the second period and a speed at which the interval of the die slit increases in the second period,
the interval of the die slit is gradually increased to match the value set according to the target wall thickness in the first period,
and then the interval of the die slit is gradually increased in the second and third periods, and
the speed at which the interval of the die slit increases in the first period is faster than the speed at which the interval of the die slit increases in the second period.

2. The blow-molding method according to claim 1, wherein the value set according to the target wall thickness is corrected in consideration of wall thickness reduction due to drawdown.

3. The blow-molding method according to claim 1, wherein a pressure in the accumulator immediately after starting extrusion is maintained at 40 bar or more.

4. The blow-molding method according to claim 1, wherein the blow-molding method is foamed blow molding, and the wall thickness of the hollow molded article to be molded is 3.5 mm or more.

5. The blow-molding method according to claim 1, wherein the resin is mainly composed of polypropylene.

6. The blow-molding method according to claim 1, wherein
the speed at which the interval of the die slit increases in the third period is faster than the speed at which the interval of the die slit increases in the second period.

* * * * *